United States Patent
Erdman et al.

(10) Patent No.: US 6,378,849 B1
(45) Date of Patent: Apr. 30, 2002

(54) METHODS AND APPARATUS FOR MOUNTING MOTORS

(75) Inventors: David M. Erdman; Subhash M. Brahmavar, both of Fort Wayne; David L. Bailey, Yoder; Harold B. Harms, Fort Wayne, all of IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,469

(22) Filed: Apr. 13, 2001

(51) Int. Cl.[7] .......................... F16F 13/00; F16F 15/00; F16F 5/00; F16F 9/00; F16M 11/00
(52) U.S. Cl. .................. 267/140.12; 267/140.4; 267/219; 188/379
(58) Field of Search .............. 267/140.11, 140.12, 267/140.13, 140.4, 219, 136; 188/378, 379; 248/636, 638, 603, 609

(56) References Cited

U.S. PATENT DOCUMENTS

| | | | | |
|---|---|---|---|---|
| 3,830,595 A | * | 8/1974 | Carpenter et al. | 248/603 |
| 4,211,383 A | * | 7/1980 | Starcevic | 248/603 |
| 4,572,471 A | * | 2/1986 | Schrepfer | 248/560 |
| 4,744,547 A | * | 5/1988 | Hartel | 267/141 |
| 5,435,531 A | * | 7/1995 | Smith et al. | 267/140.11 |
| 5,504,608 A | | 4/1996 | Neeves et al. | |
| 5,704,596 A | * | 1/1998 | Smith et al. | 267/140.11 |
| 5,788,029 A | * | 8/1998 | Smith et al. | 188/267 |
| 5,869,817 A | | 2/1999 | Zietlow et al. | |
| 5,954,169 A | * | 9/1999 | Jensen | 188/378 |
| 5,966,987 A | | 10/1999 | Yoon | |
| 6,000,084 A | | 12/1999 | Briscoe | |
| 6,098,948 A | * | 8/2000 | Boucheret | 248/603 |
| 6,107,934 A | | 8/2000 | Andreou et al. | |
| 6,220,545 B1 | | 4/2001 | Fenny et al. | |
| 6,250,560 B1 | | 6/2001 | Kline et al. | |
| 6,279,866 B1 | * | 8/2001 | Eilemann et al. | 248/638 |

* cited by examiner

*Primary Examiner*—Paul N. Dickson
*Assistant Examiner*—Devon Kramer
(74) *Attorney, Agent, or Firm*—Karl Vick, Esq.; Damian Wasserbauer, Esq.; Armstrong Teasdale LLP

(57) ABSTRACT

A method for facilitating the reduction of transmitted motor noise using a mounting system in a frame. The mounting system includes a motor assembly having an end bell, a mounting bracket including a brace, a plurality of attachment openings, a plurality of leaf springs attached to the brace and an anchor device attached to each leaf spring. Each anchor device includes a fastener opening and a grommet. The leaf springs and grommets are configured to filter and damp noise transmitted from the motor to the frame.

20 Claims, 2 Drawing Sheets

METHODS AND APPARATUS FOR MOUNTING MOTORS

BACKGROUND OF INVENTION

This application relates generally to motors, and, more particularly, to mounting systems for motors.

Typical motor mounting systems include a plurality of bolts attached to and extending from the motor housing. The extending bolts affix the motor housing directly to a frame which supports the motor and portions of the associated application. In at least some known mounting systems extension arms extend between the bolts and the frame.

A weight of the motor and associated attachments, i.e. fans, connected to the motor, induce stress into the supporting mounting systems. Operating motors generate vibrational and mechanical forces that may be transmitted through the mounting system to the frame, thus producing undesirable noise and vibrational stresses. More specifically, the mounting system transfers vibrations induced within the motor to the frame, either directly or through the extension arms. Such vibration and noise may limit motor use in the frame or may require noise isolation material at added cost to satisfy the motor user needs.

SUMMARY OF INVENTION

In an exemplary embodiment, a mounting system facilitates reducing vibrational stresses induced within a motor assembly. The motor assembly includes a mounting bracket attached to a motor end bell. The mounting bracket includes a brace, a plurality of projecting leaf springs, and an anchor device connected to each leaf spring. Each anchor device includes a grommet and a fastener opening. The grommet and fastener opening facilitate attaching each anchor device to a frame. The associated attachments extend from the frame.

The bracket, leaf springs and anchor devices support the motor assembly in the frame. The grommet and the leaf springs allow the filtering and damping of transmitted vibrational stresses and noise induced into the motor assembly. As a result, the mounting bracket facilitates quiet motor operation and reduced vibrational stress.

DETAILED DESCRIPTION

Figure 1:
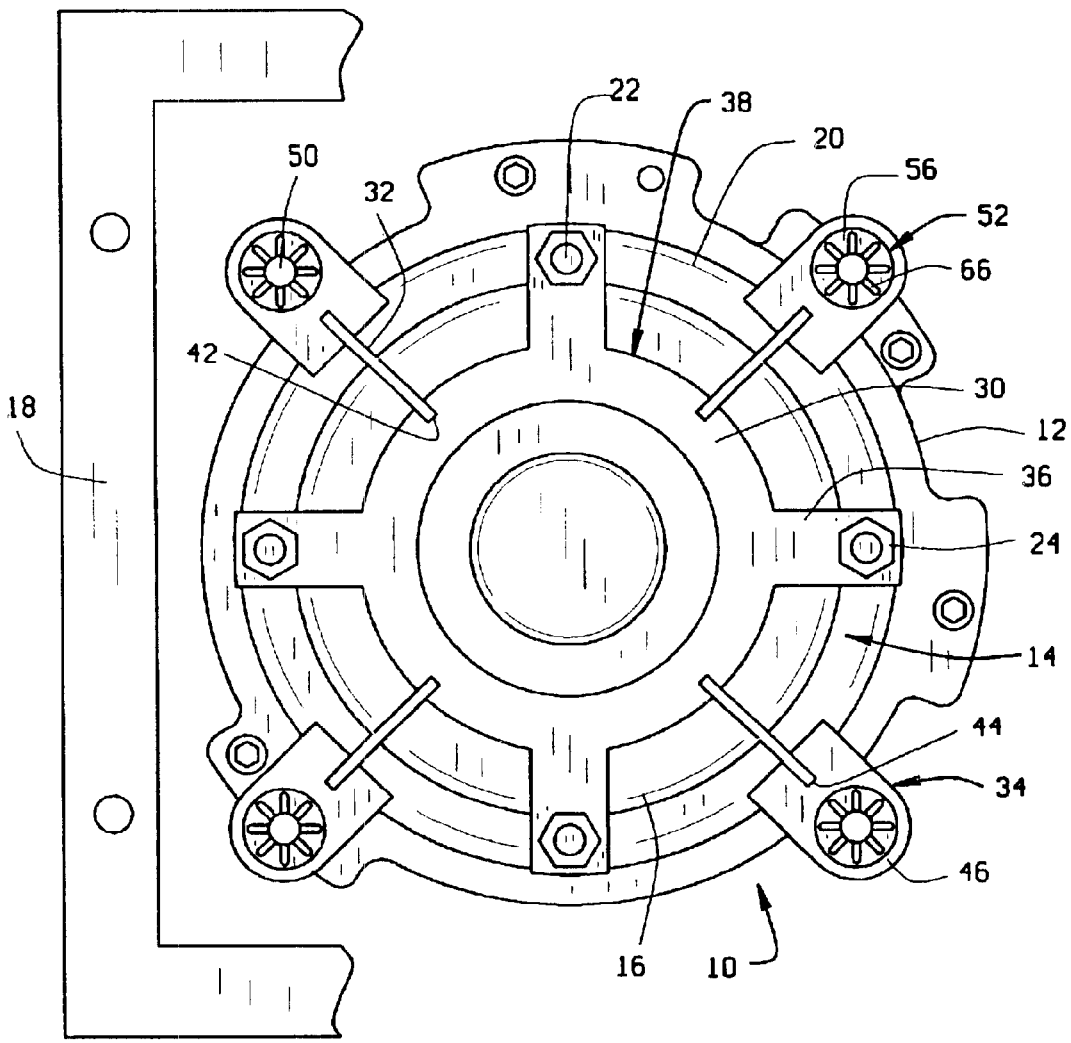
FIG. 1 is a perspective view of a mounting bracket attached to a motor end bell.

FIG. 1 is a perspective view of one embodiment of a mounting bracket 10 connected to a motor 12. Assembled together, mounting bracket 10 and motor 12 form a motor assembly 14. Motor 12 is used in a variety of applications. In the exemplary embodiment, motor 12 includes an end bell 16 and is used in a heating, ventilation, and air conditioning system including a frame 18. End bell 16 has a substantially circular bottom 20. In one embodiment, end bell 16 is fabricated from die-cast aluminum. In an alternative embodiment, end bell 16 is fabricated from any material that supports motor 12. A plurality of studs 22 extend from end bell bottom 14 and facilitate attaching mounting bracket 10 to end bell 16. In one embodiment, end bell 16 includes four studs 22. Studs 22 are spaced circumferentially and substantially equidistantly around end bell 16. More specifically, studs 22 are at a first radius 26 measured with respect to a center 28 of circular bottom 20.

Mounting bracket 10 includes a brace 30, a plurality of leaf springs 32, and an anchor device 34 attached to each leaf spring 32. In one embodiment, brace 30 has a substantially circular configuration and includes a plurality of multiple radial extensions 36 projecting from a periphery 38 of brace 30. In an alternative embodiment, brace 30 has a non-circular configuration. In the embodiment illustrated in FIG. 2, attachment openings 40 are located in each extension 36 and sized to receive studs 22. Self-locking nuts 24 are inserted on studs 22 over extensions 36 to secure mounting bracket 10 to end bell 16. Self-locking nuts 24 help prevent loosening during operation of motor 12. In one embodiment, attachment openings 40 are illustrated as circular, but in an alternative embodiment attachment openings 40 could be elongated slots (not shown) to facilitate use with multiple sized end bells or alternative attachment receiver configurations. In one embodiment, brace 30 is fabricated from steel for strength and fatigue resistance. In an alternative embodiment brace 30 is fabricated from any suitable material which provides strength and fatigue resistance.

Figure 2:
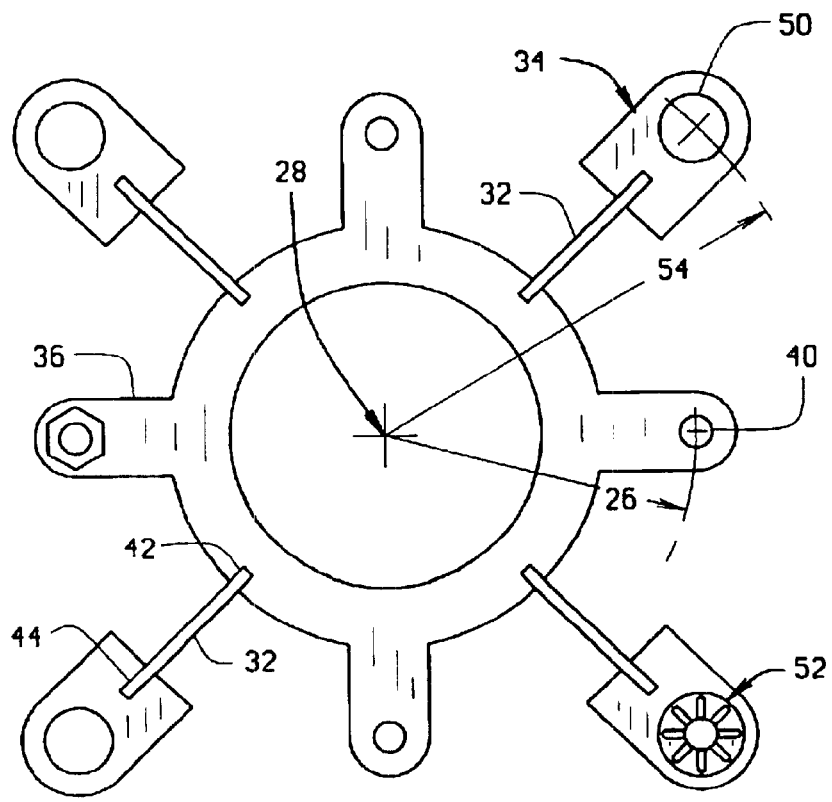
FIG. 2 is a top plan view of the mounting bracket shown in FIG. 1.

A plurality of leaf springs 32 extend radially from brace 30. In one embodiment, a proximate end 42 of each leaf spring 32 is connected to brace 30 by silver-soldering. In an alternative embodiment each leaf spring 32 is attached to brace 30 using welding, threaded fasteners or similar known methods. Leaf springs 32 are spaced equidistantly around periphery 38, between extensions 36. Each leaf spring 32 has a flexible dimension 33. As shown in FIGS. 1 and 2, flexible dimension 33 is oriented to allow responsive flexing for torsional motor movement, while leaf spring 32 provides otherwise substantially rigid support. In one embodiment each leaf spring 32 is fabricated from spring steel and is 0.03 inch by 0.2 inch by approximately 1 inch, wherein the flexible dimension 33 is 0.03 inch. In alternative embodiments, other dimension combinations are used to accommodate specific motors. Leaf spring dimensional sizes vary and are selected to facilitate the filtering of specific vibrational frequencies.

An anchor device 34 is affixed to each leaf spring 32. Anchor device 34 is attached to a distal end 44 of leaf spring 32 by welding, silver-soldering, threaded fasteners or similar method. As illustrated in FIG. 1 anchor device 34 includes a front side 46 and a back side 48. While illustrated as substantially coplanar with brace 30, in an alternative embodiment each anchor device 34 is oriented substantially perpendicular to brace 30. In one embodiment, anchor device 34 is fabricated from steel for strength and fatigue resistance.

Each anchor device 34 also includes a fastener opening 50 and a grommet 52. In one embodiment fastener opening 50 extends through anchor device 34. Each fastener opening 50 is sized to receive one grommet 52. Fastener opening 50 and grommet 52 facilitate securing anchor device 34 to frame 18. Fastener openings 50 form a second radius 54 from center 28 that is larger than first radius 26 of studs 22. In one embodiment, second radius 68 is approximately 2.9 inches and first radius 22 is approximately 2.2 inches.

Figure 3:
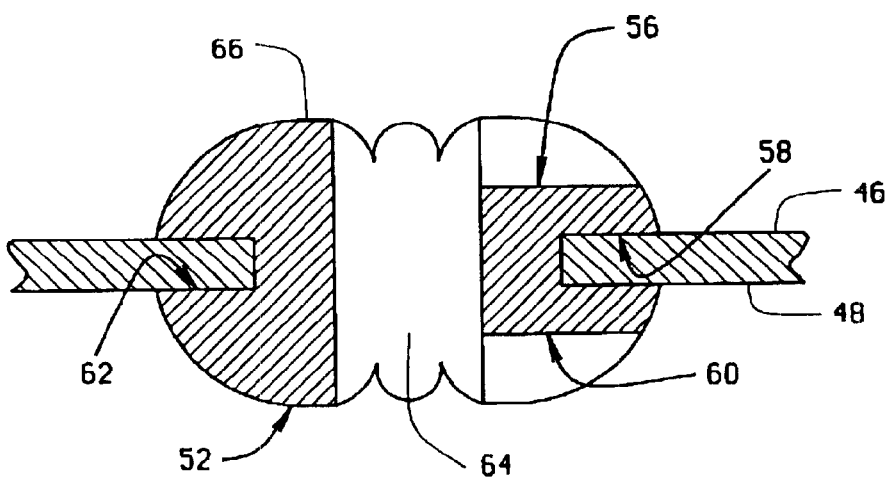
FIG. 3 is an enlarged cross-sectional view of an anchor device utilized with the mounting bracket of FIG. 1.

As illustrated in FIG. 3, grommet 52 is received within fastener opening 50 and extends concentrically around opening 50. Grommet 52 includes a front external face 56, a front internal surface 58, a rear external face 60, a rear internal surface 62 and a hollow central tube 64. Front internal surface 58 abuts front side 46 and rear internal surface 62 abuts back side 48, while central tube 64 is within opening 50. In one embodiment grommet 52 includes ribs 66 on both front external face 56 and rear external face 60. In an alternative embodiment, ribs are located on the front and rear internal surfaces, either alone or in conjunction with ribs on the external faces. Hollow central tube 64 is sized to receive a fastener (not shown in FIG. 1) to secure anchor device 34 to frame 18. The fastener received through hollow central tube 64 will vary according to frame use. Grommet 52 is fabricated from polyvinylchloride (pvc). In an alternative embodiment, grommet 52 is fabricated from any material that provides vibration damping as described herein.

Frame 18 is a substantially rigid structure with a variable configuration depending upon specific motor assembly 14 use. Frame 18 includes a plurality of attachment fixtures 68. In one embodiment, attachment fixtures 68 provide an opening sized to receive a fastener to secure anchor device 34 to frame 18. In an alternative embodiment, attachment fixtures 68 include studs to secure anchor device 34 to frame 18. The ability to receive a fastener in fastener opening 50 and grommet 52 allows flexible use of mounting bracket 10.

In use, the technician will consider the system function and select a mounting bracket to facilitate filtering vibration and noise based on a particular motor and frame. The dimensions of leaf springs in mounting bracket depend on motor construction and system use. The technician also selects a grommet compatible with the specific motor construction and system use. The technician attaches mounting bracket to end bell by inserting extending studs through attachment openings and securing brace with self-locking nuts. The technician attaches anchor device to frame using fastener opening and grommet. In an exemplary embodiment, the technician inserts a fastener (not shown) through hollow central tube and frame.

The above described mounting bracket for a motor assembly is cost-effective and reliable. A mounting bracket with specific leaf spring dimensions and grommet construction is selectively matched to a motor assembly having an end bell to facilitate low noise and vibration during in-frame operation. The studs projecting from the end bell are received in the attachment openings and secured to the brace by self-locking nuts. The anchor devices are fixed to the frame using the fastener openings and grommets. The leaf springs and grommets filter and damp vibration produced in the motor. As a result, a quiet and reliable motor assembly is provided.

While the invention has been described in terms of various specific embodiments, those skilled in the art will recognize that the invention can be practiced with modification within the spirit and scope of the claims.

What is claimed is:

1. A method for attaching a motor to a frame with a mounting assembly to facilitate reducing noise during operation, the mounting assembly including a motor having an end bell, said method comprising the steps of:
   selecting a mounting bracket for the mounting assembly, wherein the mounting bracket includes a brace, a plurality of attachment openings, and a plurality of leaf springs attached to the brace;
   attaching an anchor device to each leaf spring wherein each anchor device includes a fastener opening and a grommet;
   attaching the brace to the end bell using the plurality of attachment openings; and
   attaching the anchor device to the frame using the fastener opening and grommet.

2. A method in accordance with claim 1 wherein the end bell includes a plurality of attachment studs, said step of attaching the brace to the end bell further comprising the step of inserting the attachment studs through the plurality of attachment openings and securing the brace to the end bell with a plurality of nuts.

3. A method in accordance with claim 1 wherein said step of providing a mounting bracket further comprising the step of selecting the leaf spring dimensions.

4. A method in accordance with claim 1 wherein said step of selecting a mounting bracket further comprising the step of selecting the grommet.

5. A method in accordance with claim 1 wherein said step of attaching the anchor device to the frame further comprising the step of inserting the grommet in each fastener opening.

6. A mounting bracket for a motor comprising:
   a brace comprising a plurality of attachment openings;
   a plurality of leaf springs attached to said brace; and
   an anchor device attached to each said leaf spring, each said anchor device including a fastener opening and a grommet.

7. A mounting bracket in accordance with claim 6 wherein said plurality of attachment openings disposed a first radius from a center, said fastener openings disposed a second radius from the center.

8. A mounting bracket in accordance with claim 7 wherein said first radius smaller than said second radius.

9. A mounting bracket in accordance with claim 6 wherein said plurality of leaf springs fabricated from spring steel.

10. A mounting bracket in accordance with claim 6 wherein each said grommet comprises vibration damping resilient material.

11. A mounting bracket in accordance with claim 6 wherein said leaf springs and said grommets configured to filter vibrations transmitted through said mounting bracket.

12. A mounting bracket in accordance with claim 6 wherein said leaf springs and said grommets configured to damp vibrations transmitted through said mounting bracket.

13. A motor assembly comprising:
   a motor comprising an end bell;
   a brace comprising a plurality of attachment openings attached to said end bell;
   a plurality of leaf springs attached to said brace; and
   an anchor device attached to each said leaf spring, each said anchor device comprising a fastener opening and a grommet.

14. A motor assembly in accordance with claim 13 wherein said end bell comprises a plurality of studs, each said attachment opening sized to receive a respective said stud for securing said end bell to said brace.

15. A motor assembly in accordance with claim 14 wherein said attachment openings disposed a first radius from a center, said fastener openings disposed a second radius from the center.

16. A motor assembly in accordance with claim 15 wherein said first radius smaller than said second radius.

17. A motor assembly in accordance with claim 13 wherein said plurality of leaf springs fabricated from spring steel.

18. A motor assembly in accordance with claim 13 wherein said grommets comprise vibration damping resilient material.

19. A motor assembly in accordance with claim 13 wherein said leaf springs and said grommets configured to damp vibrations transmitted through said mounting bracket.

20. A motor assembly in accordance with claim 13 wherein said motor assembly mounts to a frame, said leaf springs and said grommets configured to filter vibrations transmitted from the motor to the frame.

* * * * *